2,892,864

ESTERIFICATION OF TEREPHTHALIC ACID IN PRESENCE OF METAL OXIDATION CATALYST

Ross O. Watson, Mount Holly, N.J., assignor to Hercules Powder Company, Wilmington, Del., a corporation of Delaware No Drawing. Application March 6, 1958
Serial No. 719,508

3 Claims. (Cl. 260—475)

The present invention relates to an improvement in the esterification of oxidates, obtained by the oxidation of aromatic compounds, that contain terephthalic acid and residual metal oxidation catalyst.

It is known in the art that various aromatic compounds can be oxidized in the liquid phase by means of an oxygen-containing gas in the presence of a metal oxidation catalyst to produce an oxidate that contains a varying amount of terephthalic acid and a residual amount of the catalyst. Where the ultimate objective of such oxidation is a methyl ester of terephthalic acid, the prior art proposes to esterify the oxidate with methanol.

One of the preferred methods for the esterification of an oxidate containing terephthalic acid comprises contacting the oxidate countercurrently with vaporized methanol at an elevated temperature, preferably in the range of 200–350° C., at a superatmospheric pressure preferably from 200–1000 p.s.i.g. Because the temperature employed in such esterification is above the normal temperature of oxidation, it is necessary to preheat the oxidate to the esterification temperature prior to its introduction into the esterification vessel. For some reason not yet fully understood, the preheating of oxidate that contains terephthalic acid and a catalytic amount of a metal oxidation catalyst leads to the deposition of a solid substance on the internal surfaces of the preheater and the liquid transfer lines connecting the preheater with the esterification vessel until eventually such a heavy deposit of solids is formed that it becomes necessary to discontinue the esterification and clean the preheater and the connecting lines. The nature of the solid deposit is not precisely known but it appears to be a complex that results from reaction of the terephthalic acid with the metal oxidation catalyst because the difficulty is not encountered when the oxidate is first freed from either terephthalic acid or the catalyst.

One solution to the problem outlined above comprises treating the oxidate to eliminate terephthalic acid or the catalyst but this is a rather expensive procedure. Accordingly, up to the present time there has been no truly satisfactory solution to the problem.

In accordance with the present invention, it has been found surprisingly that the above described deposition of solids can be minimized if a relatively small amount of methanol is added to the oxidate prior to its being preheated for the purpose of esterification. In concise form, the invention provided by this discovery is an improvement in the art of esterifying with methanol an oxidate containing terephthalic acid and metal oxidation catalyst wherein said oxidate is preheated to a temperature within the range of 200 to 350° C. which comprises adding to said oxidate a minor amount of methanol prior to preheating thereof. The effect of the methanol is not fully understood; it may act either as a solvent for the precipitate or may in some way suppress the formation of the terephthalic acid-heavy metal catalyst complex. In any event, where methanol is added as prescribed by the invention the oxidate can be continuously preheated and esterified for a considerably longer period of time, without experiencing a deposition of solids in the preheater, than is the case when methanol is not added.

The following examples are presented for the purpose of illustrating the invention. Parts and percentages are by weight except where otherwise specified.

Example 1 p-Xylene was continuously oxidized in a reactor having a volume of about 130 cubic feet at 140° C. and 150 p.s.i.g. in the presence of 170 p.p.m. of cobalt as cobalt toluate with air being passed through the reaction mixture at the rate of 800 s.c.f.m. withdrawal of oxidate from the reaction vessel was made at the rate of about 60 pounds per minute and fresh p-xylene and recycled intermediates containing about 200 p.p.m. cobalt were introduced to the reactor at about the same rate.

The oxidate had an acid number of 158 and was of the following approximate composition:

| | | |
|---|---|---|
| Toluic acid | percent | 30 |
| Terephthalic acid | do | 5 |
| Cobalt | p.p.m. | 170 |
| p-Xylene | percent | 15 |
| By-products and intermediates | do | 50 |

The oxidate was next passed at the rate of about 25 gallons per minute to a preheater. Just prior to entering the preheater the temperature of the oxidate was 170° C. and at this point methanol was injected into the oxidate at the rate of 1.5 gallons per minute. In the preheater the oxidate was forced through a pipe having an internal diameter of approximately 0.75 inch surrounded externally by a heat transfer medium whereby the oxidate was heated to a temperature of 250° C. The oxidate was then transferred via a pipe line to the top of an esterification vessel of the type described in U.S. 2,813,-891 where it was contacted countercurrently with vaporized methanol in a flooded column at a reaction temperature of about 250° C. at 500 p.si.g. The esterification was conducted continuously in this manner for eight weeks without experiencing any difficulty in the preheating and transfer of oxidate.

Previously, when the esterification process was carried out as above described with the exception that the injection of methanol into the oxidate was omitted, in about seven days trouble was experienced in maintaining the desired flow rate through the preheater and it was wound that the difficulty was attributable to a solid precipitate adhering to the interior surfaces of the preheater and lines. The preheater and lines had to be dismantled and cleaned. The same trouble was not experienced, however, in the esterification of oxidates that contained no terephthalic acid or, alternatively, no cobalt catalyst.

Example 2 p-Xylene and methyl-p-toluate were cooxidized continuously by passing a mixture of the two reactants into an oxidation vessel operated at 180° C. and 140 p.s.i.g. with air being passed through the reaction mixture at the rate of 1000 s.c.f.m. Oxidate having an acid number of 130 was continuously withdrawn at the rate of 80 pounds per minute.

The approximate composition of the oxidate was as follows:

| | | |
|---|---|---|
| p-Xylene | percent | 3 |
| Toluic acid | do | 15 |
| Methyl-p-toluate | do | 20 |
| Monomethyl terephthalate | do | 11 |
| Terephthalic acid | do | 5 |
| Cobalt | p.p.m. | 150 |
| By-products and intermediates | percent | 46 |

The oxidate was next passed at the rate of about 25 gallons per minute to a preheater, such as described in Example 1. At the point of entry to the preheater, the temperature of the oxidate was approximately 170° C. and at this point methanol was injected therein at the rate of 1.5 gallons per minute. In the preheater the temperature of the oxidate was raised to 250° C. and the oxidate was passed into the top of an esterification vessel, as previously described, where it was contacted countercurrently with vaporized methanol in a flooded column at a reaction temperature of about 250° C. under a pressure of 400 p.s.i.g. The esterification was conducted continuously in this manner for ten weeks without experiencing any difficulty in the preheating and transfer of oxidate.

When the injection of methanol was omitted, plugging of the preheater became evident in about three to ten days.

As is apparent from the examples, the process of the present invention is applicable to the esterification of any oxidate which is derived from the oxidation of an aromatic compound in the presence of a metal oxidation catalyst and which contains terephthalic acid and residual metal oxidation catalyst. For instance, the oxidate may be derived from the oxidation of pure p-xylene, from mixtures of p-xylene with other materials such as o- and m-xylene and toluic acid esters, from p-toluic acid, from p-diisopropylbenzene or from other known precursors of terephthalic acid. The only essential requirement of the oxidate is that it contain both terephthalic acid and metal oxidation catalyst since it is the combination of these two materials that leads to the difficulty experienced in the prior art. Generally, the oxidates on which the invention is applicable contain from about 1 to 30% terephthalic acid and about 50 to 600 p.p.m. of metal in the form of a salt or other derivative.

The oxidation of aromatic compounds in liquid phase is fully described in the art and need not be elaborately discussed here. Generally speaking, the oxidation is carried out at a temperature ranging from 120 to 200° C. and at a pressure of from atmospheric to 400 p.s.i.g. The metal catalysts that are employed include the oil-soluble compounds of metals that form compounds in at least two valence states, including particularly oil-soluble compounds of chromium, manganese, cobalt, iron, nickel, vanadium, molybdenum, tungsten, tin and cerium, these metals being particularly useful in the form of salts of lower aliphatic carboxylic acids and aromatic acids. For purposes of the invention, the particular metal employed is not important because when any of such metals is employed in place of the cobalt used as a catalyst in the examples, the same difficulty of deposition of solids in the preheater is experienced in the absence of methanol addition as prescribed by the invention. The oxidation may, if desired, be carried out in the additional presence of bromine which may increase the amount of terephthalic acid formed.

The amount of methanol added to the oxidate in accordance with the invention can be widely varied and does not appear to have critical limits. For instance, the amount of methanol can be as small as 0.01 part by volume per part of oxidate, but the upper limit is dictated only by economic considerations since it is desirable to employ in the esterifier as little methanol as is possible in order to minimize the task of recovering and recycling methanol from the esterification. For practical purposes, then, it is not necessary or desirable to employ more than about 0.2 part by volume of methanol per part of oxidate. Optimum results will generally be achieved when the volumetric ratio of methanol to oxidate is from about 0.05 to 0.1 part per part of oxidate.

The esterification of the oxidate at elevated temperatures is also known to the art and may be carried out, for instance, as described in U.S. 2,813,891 or by any other esterification method which requires that the oxidate be heated to a temperature above that at which it leaves the oxidation vessel.

What I claim and desire to protect by Letters Patent is:

1. In the esterification with methanol of an oxidate containing terephthalic acid and a metal oxidation catalyst wherein said oxidate is preheated to a temperature within the range of about 200–350° C., the improvement which comprises adding a minor amount of methanol to said oxidate prior to the preheating thereof to minimize deposition of solids during preheating.

2. The process of claim 1 in which the metal catalyst comprises cobalt.

3. The process of claim 1 wherein the amount of methanol added is from 0.01 to 0.2 parts per part of oxidate by volume.

References Cited in the file of this patent

FOREIGN PATENTS 623,836     Great Britain _____ May 24, 1949